US009726896B2

(12) United States Patent
von und zu Liechtenstein

(10) Patent No.: US 9,726,896 B2
(45) Date of Patent: Aug. 8, 2017

(54) VIRTUAL MONITOR DISPLAY TECHNIQUE FOR AUGMENTED REALITY ENVIRONMENTS

(71) Applicant: Maximilian Ralph Peter von und zu Liechtenstein, Rorschach (CH)

(72) Inventor: Maximilian Ralph Peter von und zu Liechtenstein, Rorschach (CH)

( * ) Notice: Subject to any disclaimer, the term of this patent is extended or adjusted under 35 U.S.C. 154(b) by 13 days.

(21) Appl. No.: 15/134,398

(22) Filed: Apr. 21, 2016

(65) Prior Publication Data

US 2016/0320625 A1    Nov. 3, 2016

(51) Int. Cl.
| | |
|---|---|
| *G09G 5/22* | (2006.01) |
| *G02B 27/01* | (2006.01) |
| *G06T 19/00* | (2011.01) |
| *G09G 5/00* | (2006.01) |
| *H04N 13/00* | (2006.01) |

(52) U.S. Cl.
CPC ..... *G02B 27/0179* (2013.01); *G02B 27/0172* (2013.01); *G06T 19/006* (2013.01); *G09G 5/00* (2013.01); *H04N 13/00* (2013.01); *G02B 2027/011* (2013.01); *G02B 2027/014* (2013.01); *G02B 2027/0132* (2013.01); *G02B 2027/0187* (2013.01)

(58) Field of Classification Search
CPC .................................................. G02B 27/0179
USPC ................................ 345/633, 634; 351/359
See application file for complete search history.

(56) References Cited

U.S. PATENT DOCUMENTS

| 6,084,556 A | 7/2000 | Zwern |
| 6,429,954 B1 * | 8/2002 | Kasai .................. G02B 5/32 |
| | | 359/13 |

(Continued)

OTHER PUBLICATIONS

Effect of Display Technology on the Crosstalk Perception in Stereoscopic Video Content; Lili et al. IEEE Transactions on Circuits and Systems for Video Technology, vol. 22, No. 9, Sep. 2012.*

(Continued)

*Primary Examiner* — Javid A Amini

(57) ABSTRACT

Methods, apparatus, and computer-readable media are described herein related to a virtual monitor display technique for augmented reality environments targeted at allowing a user of a display-enabled computing device to substitute their conventional hardware-realized display screen with a virtualized display screen of equal or better usability characteristics than the hardware-realized device. A virtual screen is rendered via a micro display in an augmented reality environment to a human user wearing a see through head mountable device. The system architecture makes use of liquid lens technology in order to adjust the relative position of the display as well as the focal distance by optical means only thereby ensuring that the virtual screen is rendered at the maximum resolution of the micro display at all times. The system architecture also comprises an occlusion matrix thereby ensuring that the virtual screen is free of ghosting. The system is configured in such a way that a display auto-hide function is triggered whenever certain threshold parameters are exceeded. The virtual monitor display technique described herein has been designed with the aim of reducing the effects simulator sickness during prolonged use of the virtual display.

19 Claims, 12 Drawing Sheets

(56) References Cited

U.S. PATENT DOCUMENTS

| | | | | |
|---|---|---|---|---|
| 6,445,364 B2* | 9/2002 | Zwern | | 345/156 |
| 7,177,083 B2* | 2/2007 | Holler | | G02B 7/28 |
| | | | | 348/E5.145 |
| 7,201,318 B2* | 4/2007 | Craen | | G02B 3/14 |
| | | | | 235/454 |
| 7,230,583 B2* | 6/2007 | Tidwell | | G02B 27/017 |
| | | | | 345/32 |
| 7,512,902 B2* | 3/2009 | Robertson | | G06F 3/0481 |
| | | | | 715/782 |
| 8,046,719 B2 | 10/2011 | Skourup et al. | | |
| 8,750,577 B2* | 6/2014 | Britz | | G02B 3/14 |
| | | | | 382/117 |
| 9,304,319 B2* | 4/2016 | Bar-Zeev | | G02B 3/14 |
| 2002/0039232 A1* | 4/2002 | Takeyama | | G02B 5/32 |
| | | | | 359/566 |
| 2006/0033992 A1* | 2/2006 | Solomon | | G02B 27/017 |
| | | | | 359/462 |
| 2006/0119951 A1* | 6/2006 | McGuire, Jr. | | G02B 27/0081 |
| | | | | 359/630 |
| 2007/0038960 A1* | 2/2007 | Rekimoto | | G06F 3/002 |
| | | | | 715/848 |
| 2009/0168010 A1* | 7/2009 | Vinogradov | | G06K 7/10792 |
| | | | | 349/200 |
| 2010/0103077 A1* | 4/2010 | Sugiyama | | G02B 27/017 |
| | | | | 345/8 |
| 2010/0295987 A1* | 11/2010 | Berge | | G02B 3/14 |
| | | | | 348/360 |
| 2011/0075257 A1* | 3/2011 | Hua | | G02B 27/017 |
| | | | | 359/464 |
| 2012/0032874 A1* | 2/2012 | Mukawa | | G02B 3/12 |
| | | | | 345/8 |
| 2012/0068913 A1* | 3/2012 | Bar-Zeev | | G02B 26/026 |
| | | | | 345/8 |
| 2012/0127062 A1* | 5/2012 | Bar-Zeev | | G02B 3/14 |
| | | | | 345/6 |
| 2012/0306940 A1* | 12/2012 | Machida | | G02B 6/005 |
| | | | | 345/690 |
| 2014/0035959 A1* | 2/2014 | Lapstun | | H04N 13/0402 |
| | | | | 345/690 |
| 2014/0063055 A1* | 3/2014 | Osterhout | | G06F 3/005 |
| | | | | 345/633 |
| 2014/0177023 A1 | 6/2014 | Gao et al. | | |
| 2016/0097929 A1* | 4/2016 | Yee | | G02B 27/0101 |
| | | | | 359/631 |
| 2016/0131912 A1* | 5/2016 | Border | | G02B 27/0176 |
| | | | | 345/8 |
| 2016/0142703 A1* | 5/2016 | Park | | G09G 3/001 |
| | | | | 348/39 |
| 2016/0147067 A1* | 5/2016 | Hua | | G02B 27/017 |
| | | | | 345/419 |
| 2016/0179193 A1* | 6/2016 | Du | | G06F 3/013 |
| | | | | 345/633 |
| 2016/0239080 A1* | 8/2016 | Marcolina | | G06F 3/011 |
| 2016/0260258 A1* | 9/2016 | Lo | | G06T 7/00 |

OTHER PUBLICATIONS

Masked Depth Culling for Graphics Hardware Magnus Andersson et al. ACM Transactions on Graphics, vol. 34, No. 6, Article 188, Publication Date: Nov. 2015.*

Andrew Maimone et al., Computational Augmented Reality Eyeglasses, IEEE International Symposium on Mixed and Augmented Reality (ISMAR), 2013.

Sheng Liu et al., An Optical See-Through Head Mounted Display with Addressable Focal Planes, IEEE International Symposium on Mixed and Augmented Reality (ISMAR), 2008.

* cited by examiner

VIRTUAL MONITOR DISPLAY TECHNIQUE FOR AUGMENTED REALITY ENVIRONMENTS

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to apparatus, methods, and computer-readable media for displaying a simulated computer monitor or virtual desktop in an augmented reality environment comprising the use of a see through head-mountable device.

Prior Art

Any discussion of the related art throughout the specification should in no way be considered as an admission that such related art is widely known or forms part of common general knowledge in the field.

When working with computers in an office or home setting the trend over recent decades has been to increase miniaturization and portability. The only parts of computer equipment which have not been subject to this process were those where ergonomical considerations have prevented further miniaturization. Screens and keyboards are a prime example of equipment where miniaturization is generally considered counterproductive in terms of usability. Whilst a bigger screen yields a better user experience on the whole, it also comes at a price in terms of placing significant space demands on an office desk and in reduced portability due to its weight and dimensions. Furthermore, scaling up the size of a screen comes along with a corresponding increase in cost. There have been attempts to virtualize a computer screen in the prior art, but the present state of the art does not offer a monitor virtualization system capable of satisfying enterprise requirements in an office environment.

With the advent of augmented reality and virtual reality technology a considerable number of contributions to improved display devices have been made in recent years. In particular there have been a considerable number of approaches attempting to superimpose a computer display onto a real-world image. Presently there are two separate avenues which have been demonstrated on the consumer market. On the one hand there exists the Virtual Desktop (developed and published by Guy Gordin), which is an application developed for the Oculus Rift and HTC Vive that lets the user interface their computer in virtual reality. On the other hand, there are a host of see through augmented reality devices, such as Google Glass, which feature virtual display overlaid onto the real-world. Generally any overlaid screens are subject to ghosting, meaning that these displays are see-through in such a way that the user can still see the real world behind a display. The augmented reality displays also render screen overlays generally in a way that does not take into account changes in the attitude of the user's head or the user's location. In most instances the relative position and focal distance of such displays are pre-set and cannot be changed by the user. Very often the disparity between focus depth and vergence which typically besets such devices makes the user experience unsatisfactory, especially if the screen displays are viewed for prolonged times.

U.S. Pat. No. 6,084,556 issued on Jul. 4, 2000 to Arthur Zwern discloses a novel method to simulate a virtual desktop in a virtual reality environment. The described embodiments relate particularly to visually impaired computer users controlling their desktop computer through a magnified image of the screen displayed in a virtual reality environment.

U.S. Pat. No. 8,046,719 B2 issued on Oct. 25, 2011 to Charlotte Skourup et al. for configuring, monitoring and/or operating a graphical user interface in two or three dimensions. In particular it is concerned with a graphical user interface used for controlling, monitoring and/or operating equipment in a control system of an industrial process or an installation for oil and gas or for an installation for electrical power generating, transmission and/or distribution.

SUMMARY

The present invention recognizes that it is desirable to move from computer screens realized as hardware components to screens virtualized in an augmented reality environment. The main challenge that the present invention aims to overcome is how to provide the user with a virtualized screen that has at least the same, or ideally an even better level of usability compared to a conventional computer monitor realized as a hardware component.

The present inventor considers it desirable to separate the input devices from the display device in such a way that a conventional notebook computer, for example, would no longer comprise an inbuilt screen, but that the screen ought to be virtualized in augmented reality. A preferred embodiment of the present invention therefore is a notebook-type computer device whereby the screen or monitor is virtualized by a see through head mountable device.

A major advantage of screen virtualization is increased privacy. It thus becomes possible for the user of a notebook-type computer device to view private or confidential material in a crowed place without any danger of compromising privacy since only the wearer of the head mountable device is able to view the screen. Due to the restricted usability of the known prior art solutions, no system is presently known which combines the usability of a notebook computer with the privacy benefits that only a retinal projection display, such as found on see through head mountable devices, can deliver.

A further disadvantage of a large physical monitor is that it occludes the field of view of the user to a significant extent, even at a time when the monitor is either not in use, or not being actively used. Embodiments of the present invention therefore automatically hide the monitor in such situations. An example in an office setting would be an open plan office space where co-workers face each other across their desks. Assuming that each office worker had a very large conventional computer monitor in front of them, it would significant restrict opportunity for social interaction across a desk since each user is practically shielded from such interaction by the size of their computer monitors. This is different, however, when certain embodiments of the present invention are utilized. When using a virtualized monitor with full occlusion support in a preferred embodiment of the present invention, there is no significant difference to a hardware monitor as long as the user looks straight at the monitor. If, however, the user glances up or looks around the office, the display can be configured so that it auto-hides in such situations. The virtualized monitor therefore disappears from view altogether and what was occluded previously by the monitor now becomes visible. The user can now enjoy an unobstructed view of their office. The same could be configured to happen, if the user got up and moved around the office, while still wearing the head-mountable device. The system would detect that the user has gotten up from their seat and as a result auto-hide the computer display, if so configured.

In order for the various embodiments of the present invention to be able to match the usability of a conventional hardware monitor a number of limitations exhibited by current state of the art devices had to be overcome. Presently users can choose primarily between two types of head mountable display devices, namely virtual reality head mountable devices (such as Oculus Rift for example) and augmented reality head mountable devices (such as Google Glass for example). Generally virtual reality head mountable devices are capable of rendering a high-quality video display, however the fact that they are very bulky and completely shield the user from any form of meaningful interaction with people in the real world rules them out for prolonged everyday use in a typical office environment. Lightweight augmented reality head mountable devices on the other hand would pass the test for user acceptance in such an environment. However, prior art see-through head mountable devices tend not to be optimized for computer monitor virtualization and as such the quality of the display is not sufficient to allow such devices to be serious contenders for replacing hardware monitors in a professional setting. The problems which have to be overcome are manifold.

Firstly most commonly available lightweight see-through augmented reality headsets do not offer occlusion support. Therefore any displayed screen is necessary half-transparent, a problem known as "ghosting", which would render any such display unsuitable for professional use as a monitor replacement. However, there are several known techniques to overcome ghosting, especially those making use of spatial light modulators or multi-cell liquid crystal shutters in order to render a select part of the real-world view opaque so that it may be subsequently overlayed with an image of the virtualized monitor. A preferred embodiment of the present invention uses a spatial light modulator in combination with lightweight augmented reality glasses in order to accomplish that goal.

The present inventor has realized that in order to be able to provide maximum resolution of an augmented reality (AR) virtual monitor it is advantageous to adjust the relative position of the virtual screen AR object exclusively by optical means as opposed to simulating such a repositioning move via the pixel matrix of the associated micro display thus preserving maximum resolution and avoiding undesirable pixilation of the target image.

Almost all commonly available head mountable see-through augmented reality devices present the image at a fixed single distant focal plane, which means that unlike the real world, the brain cannot sense any depth information from the focus of the lens in the eyes. Instead the brain gets depth cues from the images by measuring how much the eyes have to rotate toward each other to look at an object, an effect known as "vergence". Head-mountable augmented reality devices can cause nausea in a user, so called "simulator sickness", if the vergence distance differs from the focus distance. In order to ensure that virtualized computer monitors, such as disclosed in various embodiments of the present invention, do minimize user discomfort, a varifocal display comprising the use of liquid lens technology is employed. Using this technology the user is capable of setting the focal distance of the virtualized monitor to a desired value. An embodiment of the present invention uses a monocular display coupled with binocular occlusion. This is another measure not known in the prior art to reduce simulator sickness, whilst at the same time making the head mountable device less complex, less bulky and less weighty.

A further advantage of using liquid lens technology in the preferred embodiments is that in addition to being able to refocus at variable focal distances the virtual image can also be offset in any direction, such as moving the virtualized monitor up or down and left or right.

This disclosure provides, in part, an apparatus for displaying a display screen to a user of a display-enabled device.

This disclosure also provides, in part, a method for enabling a user of a see through head mountable device to be presented with a virtualized display screen.

This disclosure also provides, in part, a nontransitory computer-readable medium on which are stored program instructions that, when executed by a processor, cause the processor to perform the operations of presenting a virtualized display screen to the wearer of a see through head mountable device.

There has thus been outlined, rather broadly, some of the features of the virtual monitor display technique in order that the detailed description thereof may be better understood, and in order that the present contribution to the art may be better appreciated. There are additional features of the virtual monitor display technique that will be described hereinafter and that will form the subject matter of the claims appended hereto. In this respect, before explaining at least one embodiment of the virtual monitor display technique in detail, it is to be understood that the virtual monitor display technique is not limited in its application to the details of construction or to the arrangements of the components set forth in the following description or illustrated in the drawings. The virtual monitor display technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Among the display screens known in the prior art are both hardware realized screens, such as the computer monitors integrated with a common notebook computer and virtualized screens, such as those integrated with common head mountable devices of which Google Glass would be an example. The known hardware realized monitors are cumbersome in that they are bulky, weighty and view-obstructing when not in use. Moreover conventional hardware realized monitors are generally targeted for just one single user per session and therefore the fact that it is easy for other people to look over the user's shoulder and observe the screen is deemed a disadvantage in terms of privacy. Conventional hardware realized monitors may be scaled up to almost any size, however the disadvantages mentioned hereinabove as well as the cost of production will generally scale up in equal measure. Virtualized screens, as known in the prior art, are also beset with a host of problems. Most commonly the lightweight augmented reality designs suffer from problems with "ghosting" due to lack of occlusion and "simulator sickness" due to a mismatch between focal distance and vergence distance. The virtual reality designs on the other hand tend to require a very bulky eye box that completely shields the user from the surrounding environment making any meaningful interaction with other people in the real-world surroundings nearly impossible whilst the device is worn. The present inventor has discovered that by combining a number components which are readily available on the present market, a lightweight, augmented-reality type monitor virtualization system can be created which minimizes the problems mentioned hereinabove to such an extent that the system is potentially capable of replacing a conventional computer monitor in a professional setting. The system which embodies the principles of the present invention not only has similar usability characteristics as a conventional monitor, it also has some unique advantages. It has remained for the present inventor to recognize that causing a virtual monitor to auto-hide depending on certain cues and parameters that a useful and novel function is provided to a user, namely that the available desk space becomes uncluttered due the absence of physical computer monitors and social interaction with the environment is therefore enhanced. This is particularly useful in an office environment where large physical computer monitors tend to block the line of sight around the office. Nevertheless the user is shielded from distraction across their desk by the occlusion mask whilst working with the screen because the virtual monitor is perceived similarly opaque as a conventional monitor.

Figure 1:
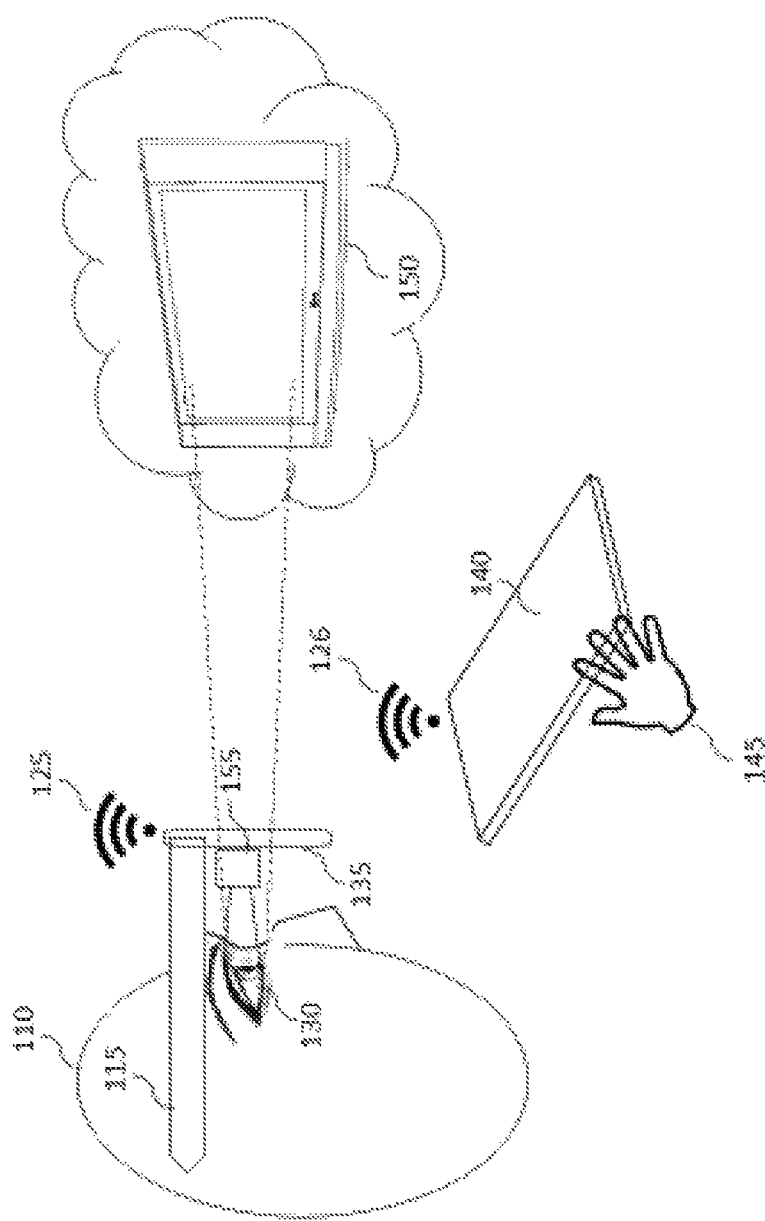
FIG. 1 is an overview diagram illustrating the concept of a virtualized screen in the context of a personal computer setting.

FIG. 1 depicts a virtualized screen 150 embodying the principles of the invention. The screen can be any type of display screen, such as a conventional computer monitor or a television screen. The user 110 may with their hands 145 operate a touch-based input device 140, which may come in the form of a computer keyboard, a mouse, a touchpad, a television remote control or any other such input device. The user 110 is wearing a see through head mountable device 115 comprising a wireless transceiver 125 which is coupled to a similar wireless transceiver 126 in an input device 140. The head mountable device 115 comprises glasses 135 which in turn comprise an occlusion matrix capable of rendering select portions opaque. The head mountable device 115 also comprises a retinal projection display 155.

Figure 2:
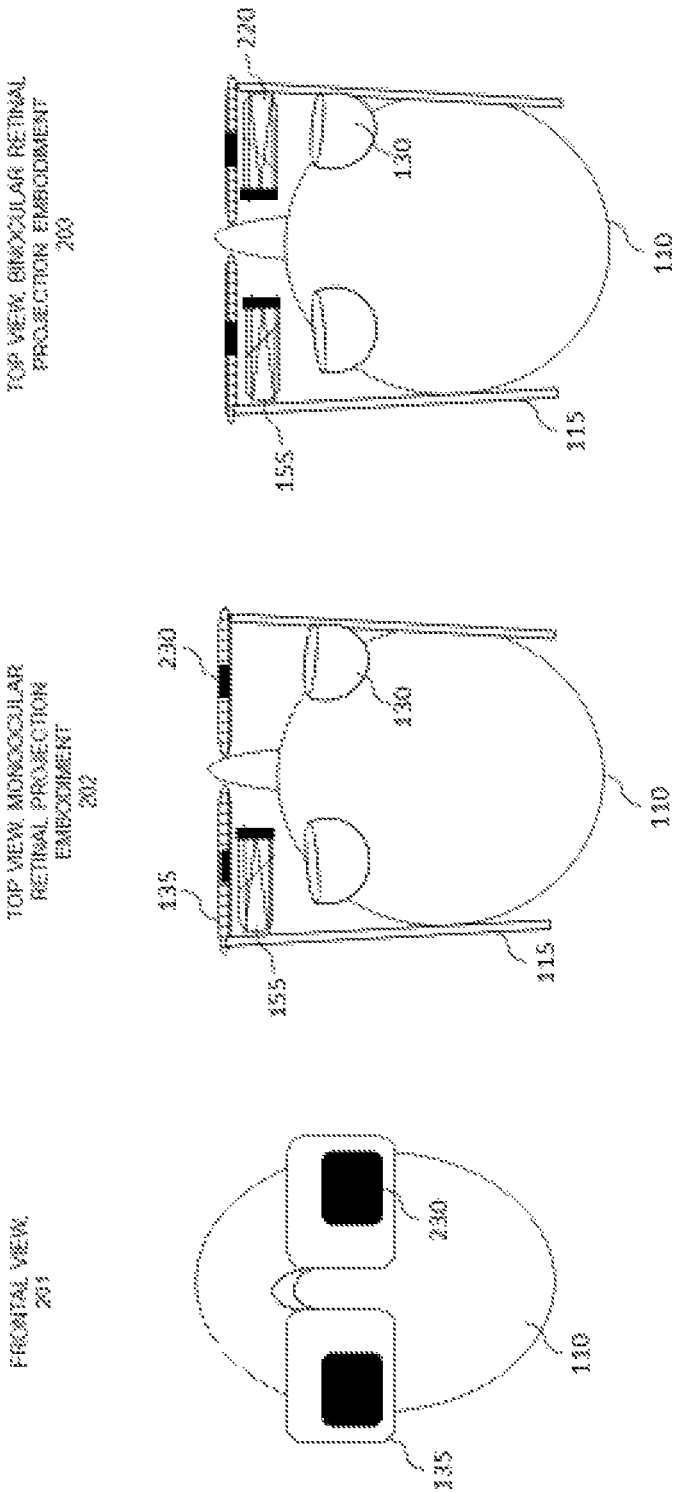
FIG. 2 is a schematic diagram giving a top view and a frontal view of the head mountable device being operated by a human user. Both the monocular and the binocular embodiments are depicted.

In FIG. 2 a frontal view 201 and two top views 202 203 of the user 110 wearing the head mountable device 115 is depicted. Both views relate to the same invention setting as shown in FIG. 1. The frontal view 230 shows the opaque areas 230 of the glasses 135, whereby the opaque areas relate to cells dynamically rendered opaque in an occlusion matrix, such as may be realized with spatial light modulators or liquid crystal multi-cell shutters. The top views 202 and 203 in the figure represent two separate embodiments of the invention, namely a monocular retinal projection embodiment 202 and a binocular retinal projection embodiment 203. Both embodiments comprise a binocular occlusion matrix 135. The present inventor has realized that a monocular retinal projection embodiment coupled with a binocular occlusion matrix offers almost the same level of usability as the embodiment comprising binocular retinal projection whilst at the same time having the benefits of a much lighter and more open design of the head mountable device. Therefore the encumbrance on the user is greatly reduced whilst only a modest reduction in usability has to be accepted as the tradeoff.

Figure 3:
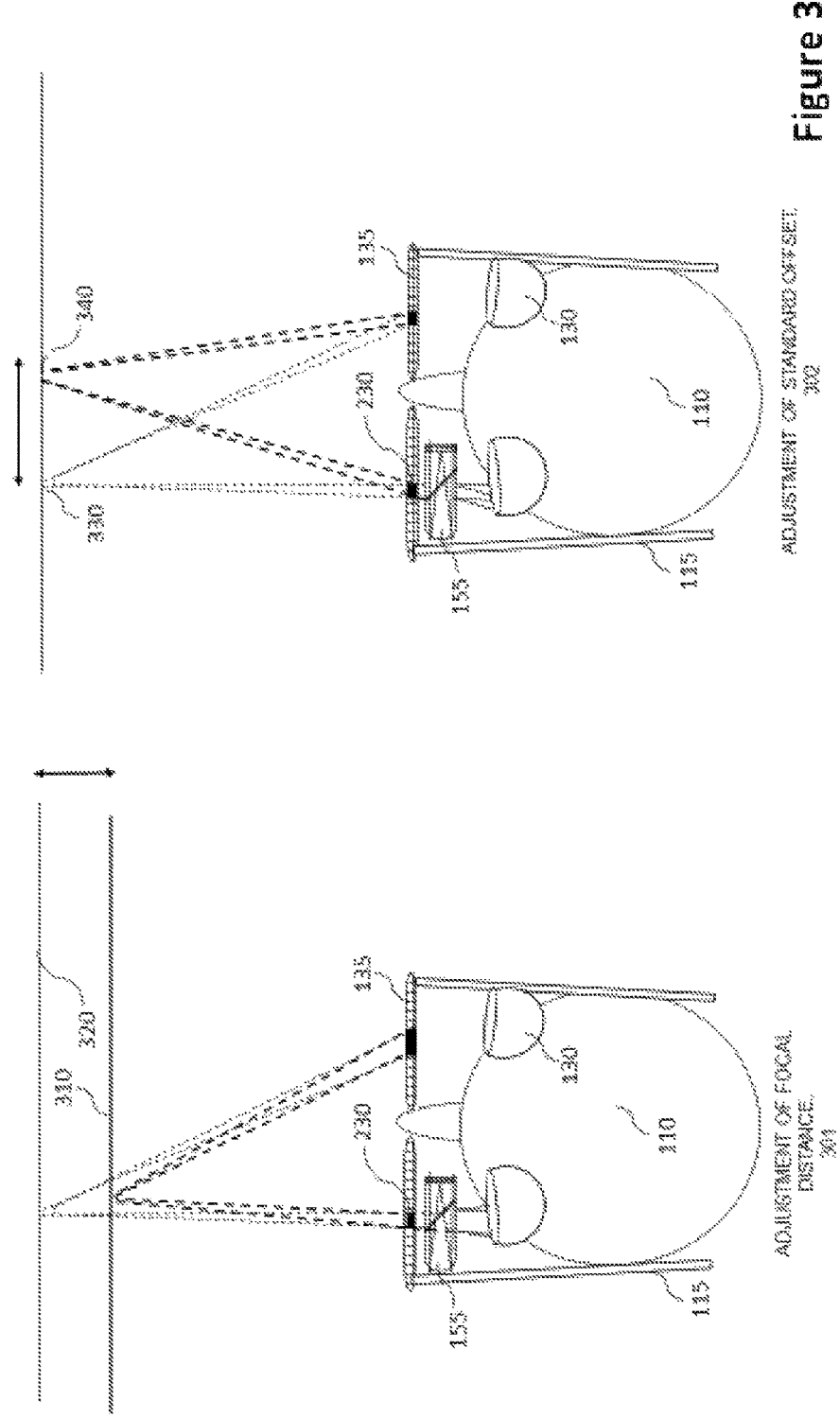
FIG. 3 is a schematic diagram illustrating the concept of adjustment of focal distance and virtual image offsets in the setting of a preferred embodiment.

In accordance with an advantageous feature of the invention, and as can be seen from FIG. 3 the head-mounted device 115 lets the user 110 adjust both the focal distance and the offset of the virtual screen. When the focal distance is altered this action is akin to moving a hardware realized monitor back 310 or forth 320 on a desk. This implies that the size of the virtual image of the virtualized screen is reduced in proportion to an increase in focal distance. Just like a real world computer monitor the virtual display is fixed in absolute size and a change of focal distance will bring a change of relative size. Whenever the relative size of the virtual image changes due to a change in focal distance, the system depicted in the embodiment will also adjust the size of the corresponding occlusion mask 230.

It is up to user preference where the virtual monitor is to be placed in the field of view 302. The default setting is that the virtual monitor is placed in a central position in the field of view. The depicted system, however, allows the user to change the default and offset the position in any direction, i.e. left/right 330 340 and up/down. Whenever the offset is altered by the user the corresponding occlusion masks have to be moved in a corresponding fashion, so that the occlusion matrix is always opaque in the line of sight of the virtual monitor.

Figure 4:
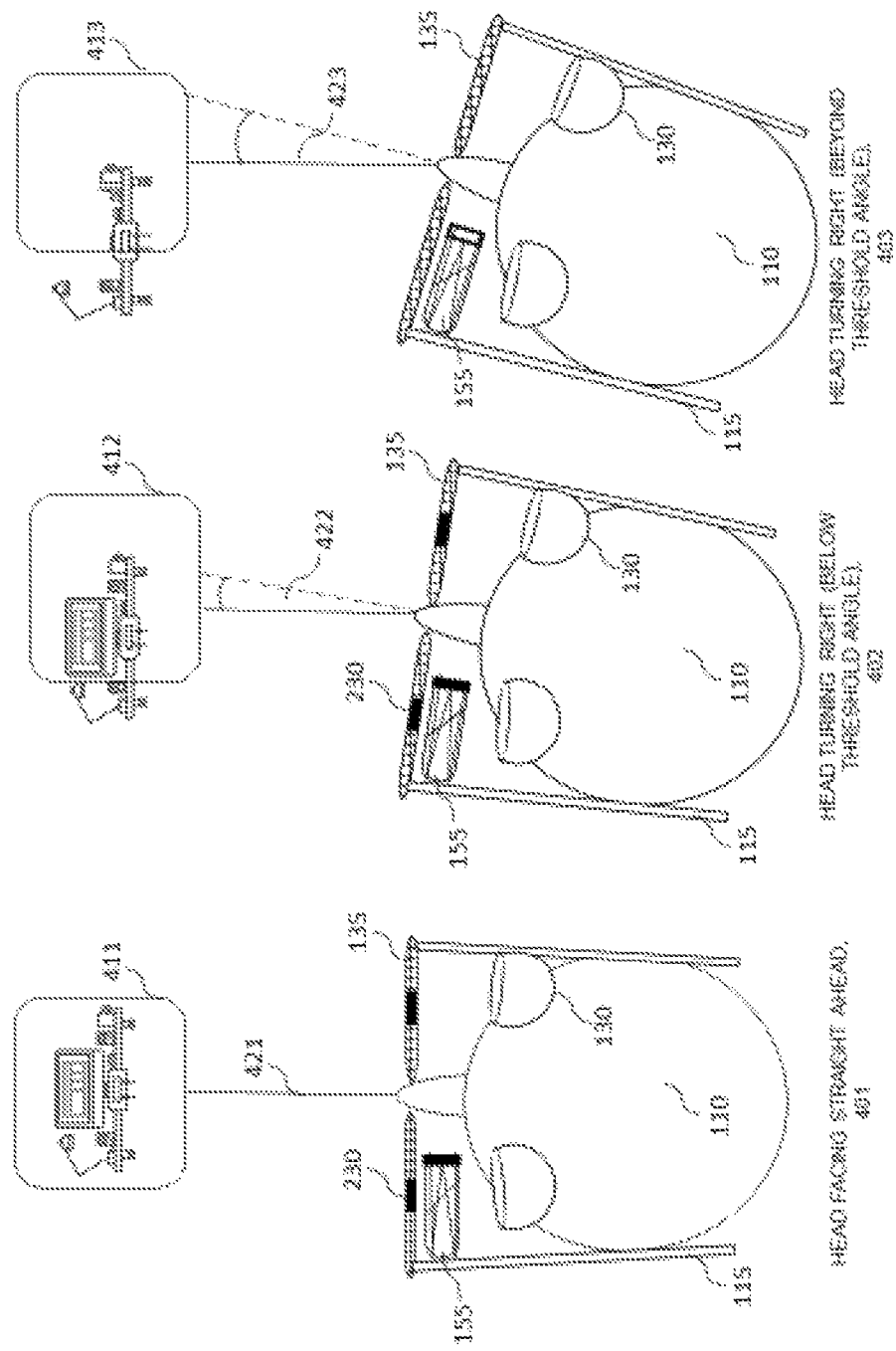
FIG. 4 is a schematic diagram illustrating the inventive concept of auto-hiding the virtual monitor once a pre-set head pan threshold angle has been exceeded.

In accordance with an advantageous feature of the invention, and as can be seen from FIG. 4, turning the head sideways will have the effect of either moving the virtual image of the computer monitor or switching of the virtual image altogether as well as clearing all occlusion masks.

Which of these two possible actions is executed in response to a turning movement of the head depends on the angle of the head movement. Once an angle pre-set as a threshold parameter is exceeded, the display is cleared of all augmented reality artifacts giving an unobstructed view of the real world. If the angle is subsequently reduced again, then the augmented reality artifacts, i.e. the virtualized monitor and the occlusion masks, reappear once more. In FIG. 4 frames 411, 412 and 413 depict the field of view of the user which is changing in response the head-turning angles 421, 422 and 423 being increased. Inside the field of view frames there is a depiction of the augmented reality scene which the user will see.

Figure 5:
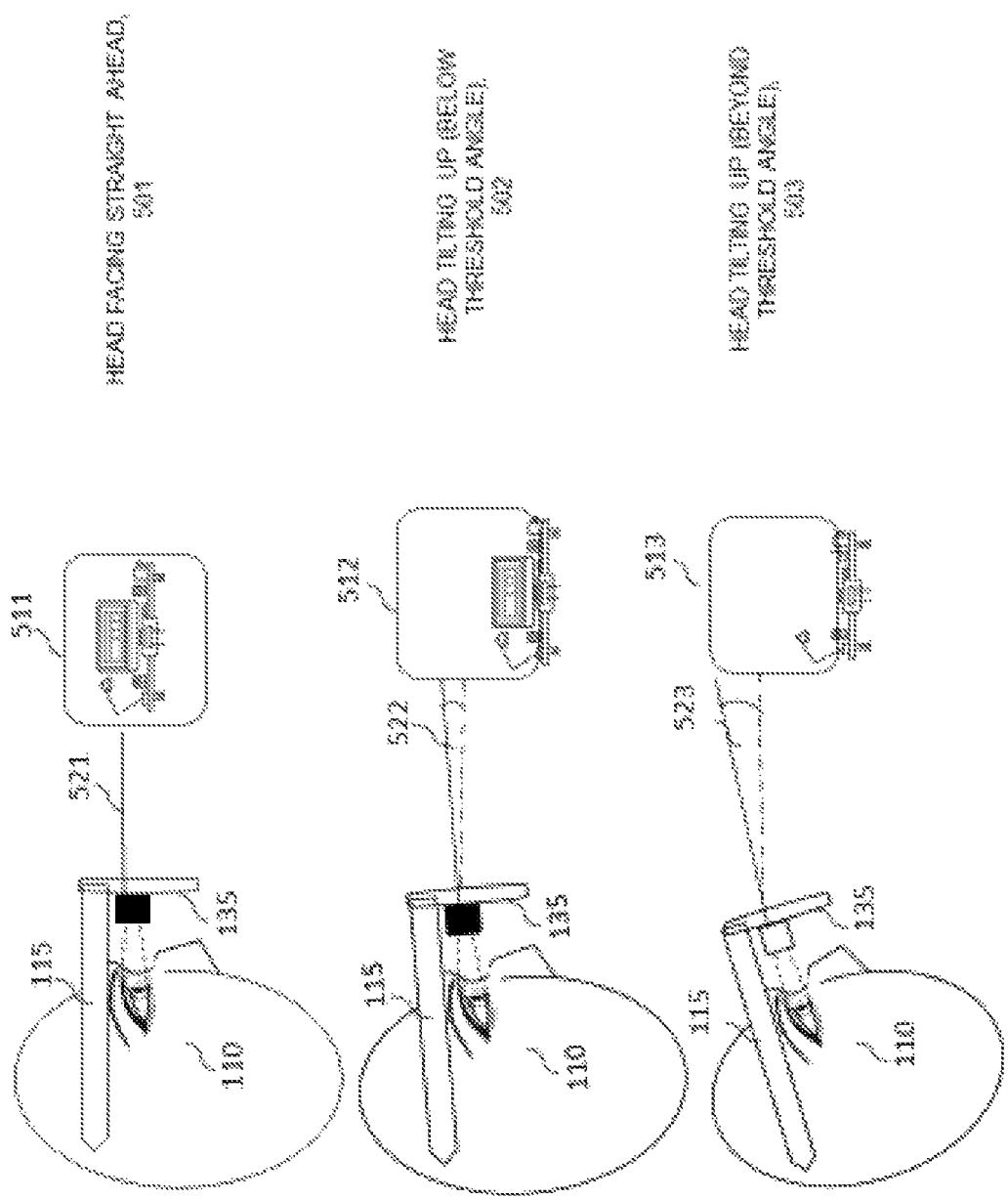
FIG. 5 is a schematic diagram illustrating the inventive concept of auto-hiding the virtual monitor once a pre-set head tilt threshold angle has been exceeded.

In accordance with another illustrative feature of the invention a preferred embodiment has a feature wherein a tilting motion of the user's head will either adjust the position of the virtual image or switch off augmented reality altogether, depending on the angle of the head tilting movement. FIG. 5 illustrates this concept for three different head tilt positions: no tilt angle 521, a tilt angle 522 below the threshold and a tilt angle 523 beyond the threshold. The field of view frames 511, 512 and 513 depict what the user would see through the head mountable device 115. Whilst the tilt angle 522 is below the threshold parameter for the auto-hide function both the virtual image and the associated occlusion mask are displayed. The virtual image and the occlusion mask are automatically adjusted in position so that the augmented reality scene appears unchanged to the user. Only once the tilt angle 523 exceeds the threshold parameter the augmented reality artifacts are turned off. This is a particularly advantageous feature of the present invention since it enables an office worker, for example, to communicate with a co-worker across a desk, without being encumbered by augmented reality artifacts for the duration of the social exchange. As soon as the user assumes a position within the threshold parameters once more, then the augmented reality virtual monitor is automatically restored and the user can resume working with the virtual screen.

The optics which were used when implementing the proof-of-concept embodiment are based on an experimental setup first described by S. Lui et al. ("An optical see-through head mounted display with addressable focal planes", 3DVIS Lab, University of Arizona). The present inventor has realized that a liquid lens, such as described by Lui et al, would not only solve the problem of projecting the virtual monitor at an arbitrary focal plane, but that a liquid lens would also be able to both change the offset of the virtual screen and to move the virtual screen in response to head movements of the user in such a way that the virtual screen appears to stay in the same place when the user makes voluntary or involuntary head movements. A further contribution of the present inventor to the prior art optical setup was the addition of an occlusion matrix to the setup in order to prevent ghosting.

Figure 6:
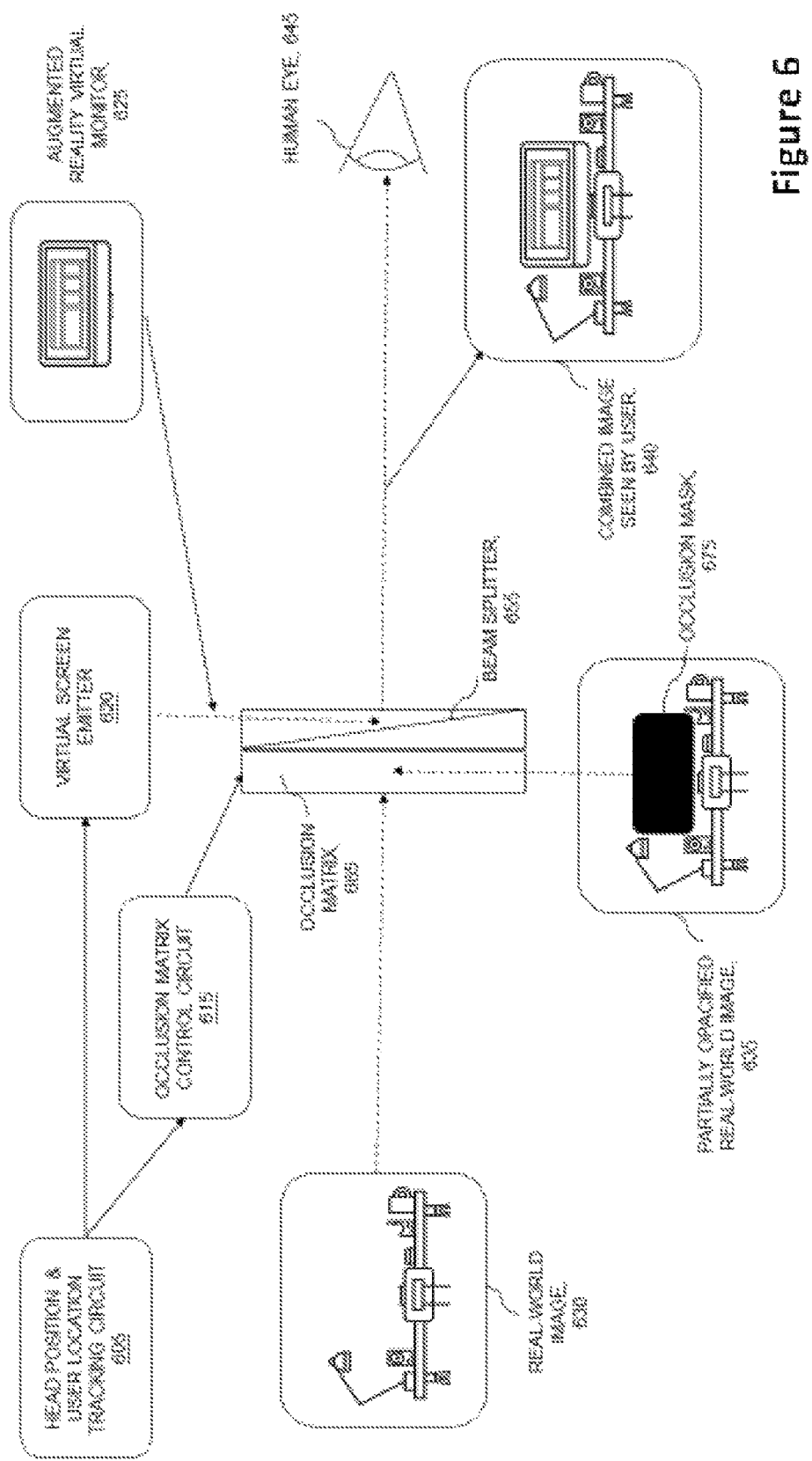
FIG. 6 is a schematic diagram giving an overview of the high-level system architecture of a preferred embodiment.

FIG. 6 is a high-level block diagram exemplifying the interaction between the various main components making up the depicted embodiment of the invention. A real world image passes through the occlusion matrix 665 wherein an occlusion mask 675 causes a section of the eyeglasses of the head mountable device to become opaque. The occlusion matrix 665 itself is controlled by a control circuit 615, which in turn takes control input from the head position and user location tracking circuit 605. The control input from tracking circuit 605 causes the occlusion control circuit 615 to shift or to auto-hide the occlusion mask in accordance with the motion of the user. The tracking circuit 605 also provides control input to the virtual screen emitter 620. The virtual screen emitter 620 is responsible for generating the image of the virtual screen and for placing it at the correct focal distance and at the correct offset position. The virtual screen emitter 620 comprises a micro display and means to vary the focal distance and offset, realized by a liquid lens in the preferred embodiment. The partially opacified real-world image 635 is combined with the image of the micro display 625 by a beam splitter 655. The combined image 640 is subsequently projected onto the eye 645 of the user by means of retinal projection.

Figure 7:
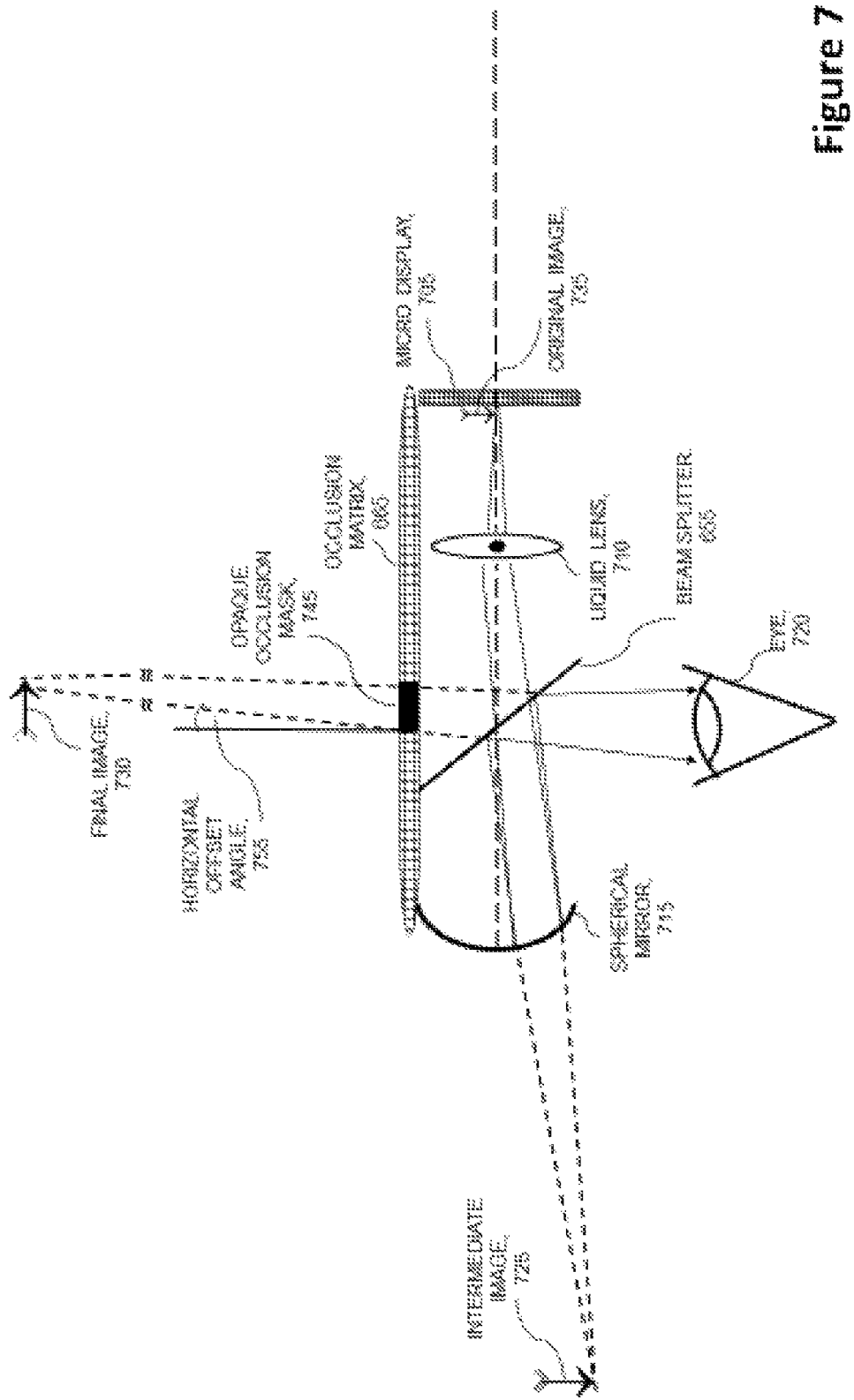
FIG. 7 is a diagram depicting the optical system of a preferred embodiment.

Based on these concepts, FIG. 7 illustrates the optical design of the preferred embodiment of the present invention. The system consists of five major components: a micro display 705, a focusing lens 710, a beam splitter 655, a spherical mirror 715 and an occlusion matrix 665. The lens is composed of an accommodation lens, realized as a liquid lens 710, with varying optical power $\phi_A$ and an objective lens with a constant optical power $\phi_0$. The two lenses together form an intermediate image of the micro display on the right side of the spherical mirror 715. The spherical mirror 715 then relays the intermediate image and redirects the light toward the user's eye 720 through the beam splitter 655. Because of the fact that the liquid lens is the limiting aperture of the optics it is placed at the center of curvature of the spherical mirror so that a conjugate exit pupil is formed through the beam splitter. Placing the eye at the conjugate pupil position, the viewer sees both the virtual image of the micro display and the real world through the beam splitter. The real world behind the virtual image, however, is obscured by means of an occlusion mask 665 which renders the glasses of the head mountable device opaque in the area defined by the occlusion mask.

As the liquid accommodation lens changes its optical power, the intermediate image will be displaced towards or away from the focal plane of the spherical mirror. Correspondingly, the virtual image will be formed either far or close to the eye. Based on the first-order optics, the accommodation cue d of the head mountable device, which implies the distance from the eye to the virtual image plane, is determined by:

$$d = \frac{-uR}{2u + R + uR\varphi}$$

where $\phi=\phi_0+\phi_A-\phi_0\phi_A\phi t$ denotes the combined optical power of the focusing lens, t is the separation between the objective and accommodation lenses, u is the object distance from the micro display to the focusing lens and R is the radius of curvature of the spherical mirror.

A proof-of-concept embodiment uses an Arctic 320 liquid lens (manufactured by Varioptic Inc.) which has a varying optical power from −5 to 20 diopters by applying an AC voltage from 32 $V_{rms}$ to 60 $V_{rms}$. The liquid lens, with a clear aperture of 3 mm, is attached to a singlet lens with an 18 mm focal length. The virtual image emitter in the proof-of-concept embodiment is a 0.59" full-color organic light emitting diode micro display with 800×600 pixels and a refresh rate up to 85 Hz (eMagin Inc.). The spherical mirror in the proof-of-concept embodiment has a radius of curvature of 70 mm and a clear aperture of 35 mm. Based on those parametric combinations the described embodiment yields an exit pupil diameter of 3 mm, an eye relief of 20 mm, a diagonal field of view (FOV) of about 28°, and an angular resolution of 1.7 arcmins.

The occlusion matrix in the preferred embodiment is realized by a high-speed transmissive spatial light modulator that controls the intensity of passing light through attenuation, in this case a transparent liquid crystal display. Real world light rays are blocked if they coincide with the occlusion mask relating to the virtualized screen which is intended to appear opaque. The occlusion mask in the preferred embodiment is specified as a light field wherein the occlusion mask light field is a mirror image of a hypothetical image light field pertaining to the virtual screen, where object pixels within the occlusion mask are assigned an intensity of 0 (opaque) and all other pixels are assigned an intensity of 1 (transparent). The preferred embodiment of the present invention requires at least 480 Hz modulators for smooth motion at 60 Hz. However panels in excess of 240 Hz rates would also be sufficient. High light efficiency of the spatial light modulator is also an important consideration for the see-through design. A considerable amount of light is lost through the polarizers of liquid crystal displays. Therefore in order to provide high spatial resolution over a wide field of view ultra-high density modulators are needed in the size of the eyeglasses of the head mountable device in a preferred embodiment. A simple proof-of-concept embodiment of the present invention uses a liquid crystal spatial light modulator obtained from a Epson Powerlite 5000 3LCD projector having a 26.4 mm by 19.8 mm active area, a 800 by 600 resolution and a 85 Hz refresh rate.

Figure 8:
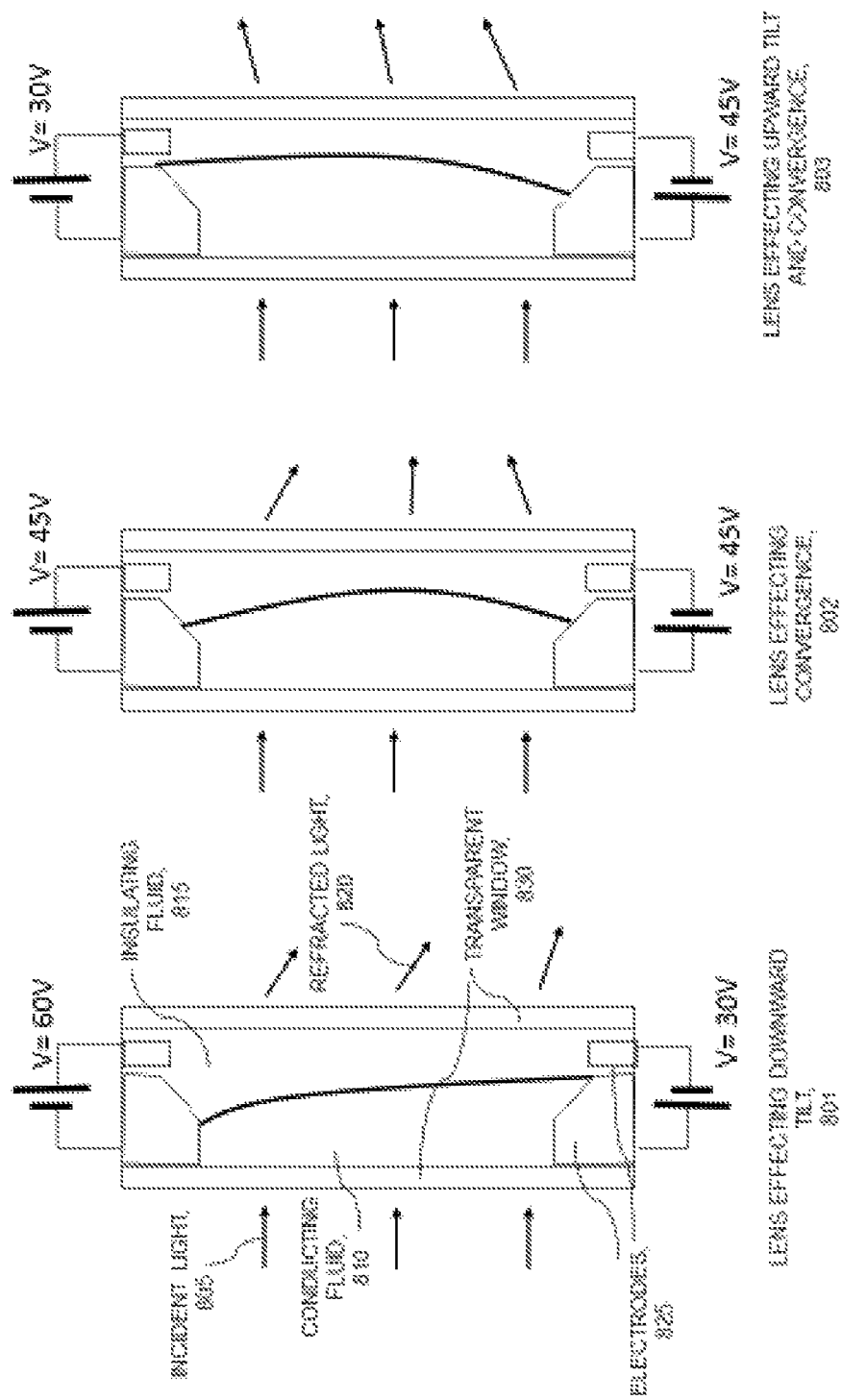
FIG. 8 is a diagram depicting the optical lens components and their operation as used in a preferred embodiment.

FIG. 8 depicts the advantageous properties of the liquid lens used in the preferred embodiment of the present invention. A liquid lens of the type shown in the figure is capable of changing tilt along two axes and simultaneously varying focus. The liquid lens comprises two different types of fluids, one of which is conducting 810, the other one is insulating 815. The liquids are enclosed in transparent windows 830. A plurality of at least two electrodes 825 applies a voltage differential between the conducting and the insulating liquid causing the conducting liquid to change surface shape. Using the voltage differentials as a means for controlling the optical properties of the lens, it becomes possible to use the liquid lens for tilting 801, convergence 802 and a combination of both 803.

Figure 9:
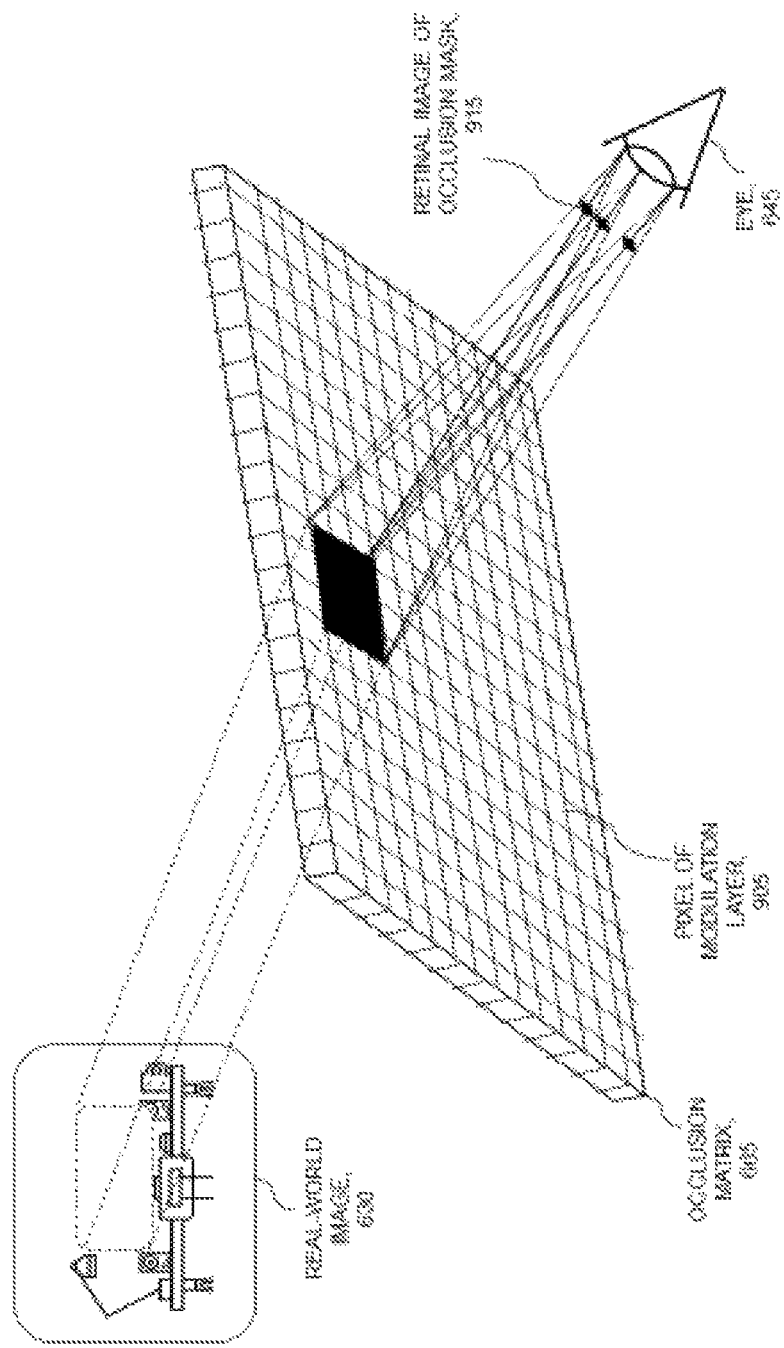
FIG. 9 is a schematic diagram depicting the operation and makeup of the occlusion matrix.

The principles of occlusion masking, such as used in a preferred embodiment of the present invention, are illustrated in FIG. 9. The preferred embodiment uses a single modulation layer of a spatial light modulator. However any technology whereby pixels in a transparent material 905 can be dynamically controlled to appear opaque would be a suitable alternative. A liquid crystal multi-cell shutter would constitute one such an alternative embodiment.

Figure 10:
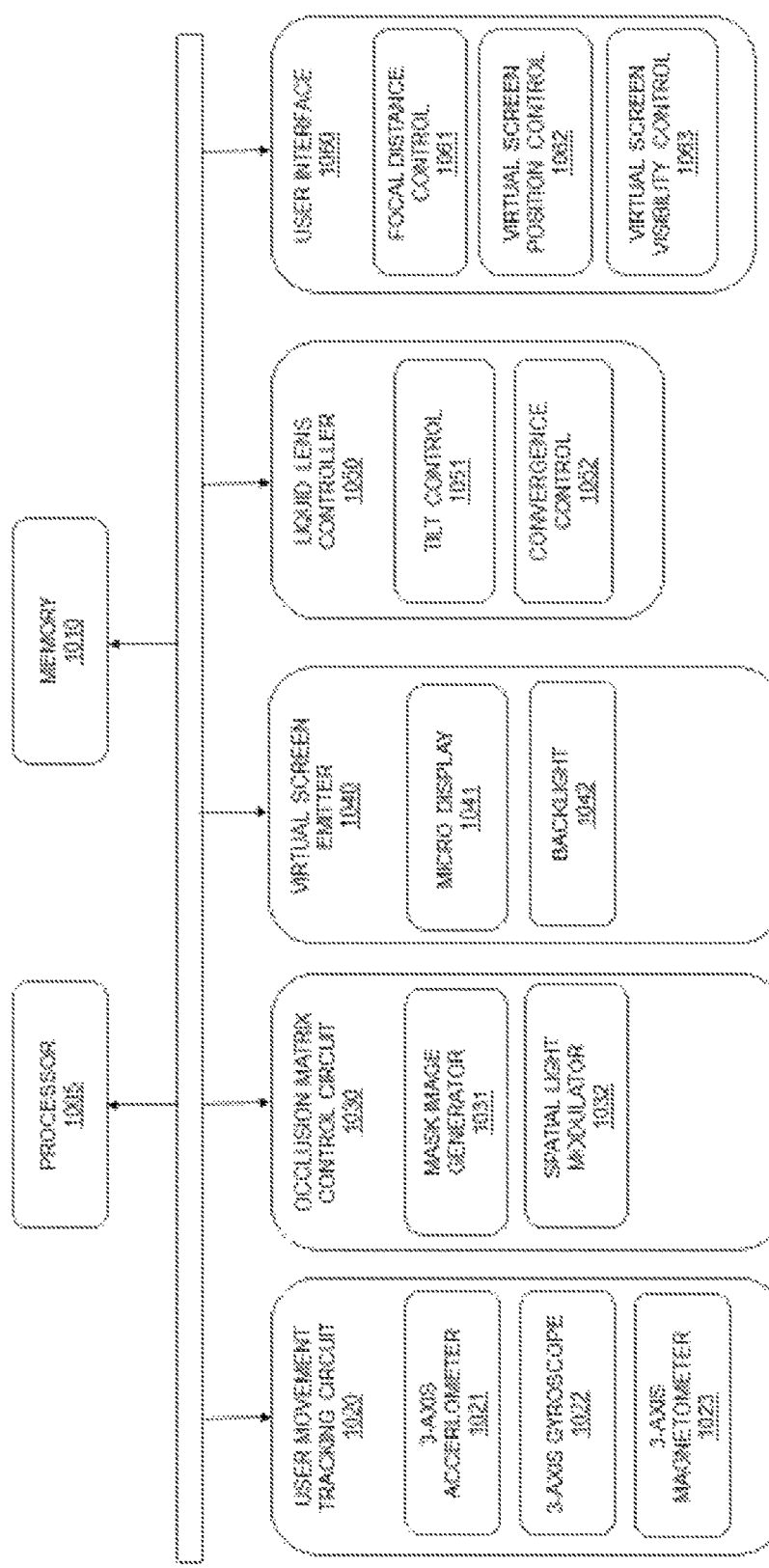
FIG. 10 is a block diagram depicting the system architecture of the optic system controller in the context of a preferred embodiment.

A high-level architectural overview relating to the constituent components of the optical system as realized by the preferred embodiment of the present invention is depicted in FIG. 10. The system comprises a plurality of at least one processor 1005 and memory 1010. A user movement tracking circuit 1020 is tasked with keeping track of the user's overall position, such as any movements around the rooms or leaving the room, as well as tracking head movements of the user, such as tilting the head up or down. The preferred embodiment achieves these requirements by using a 3-axis accelerometer 1021, a 3-axis gyroscope 1022, and a 3-axis magnetometer 1023. Those skilled in the art will appreciate that any other sensors capable of fulfilling the same user position and head movement tracking requirements may be used in alternative embodiments. The system further comprises a virtual screen emitter 1040, which in turn comprises a micro display 1041 and a backlight 1042. The liquid lens controller unit 1050 comprises a tilt controller 1051, which is responsible for repositioning the augmented reality image of the virtual monitor in response to user movements, and a convergence controller 1052, which is responsible for adjusting the focal distance of the virtual monitor. The preferred embodiment also comprises a user interface 1060 which serves the purpose to allow the user to set defaults and initial parameters for the optical system. The focal distance control 1061 determines how far in terms of focal distance the virtual monitor is placed away from the user. The virtual screen position control 1062 allows the user to set offsets relating to the default position of the virtual monitor in relation to the line of sight of the user. The position control is somewhat equivalent to the user being able to move the virtual monitor around on their desk similar to how they would be able to reposition a physical hardware-realized monitor. The virtual screen visibility control 1063 relates to the user setting parameters as to when the virtual screen enters auto-hide mode. An advantageous feature of the present invention is that the user can customize a number of parameters comprising maximum head tilt and pan angles as well as distance away from a fixed location, such as the user's desk, which will then auto-hide the virtual monitor once these thresholds are exceeded.

Figure 11:
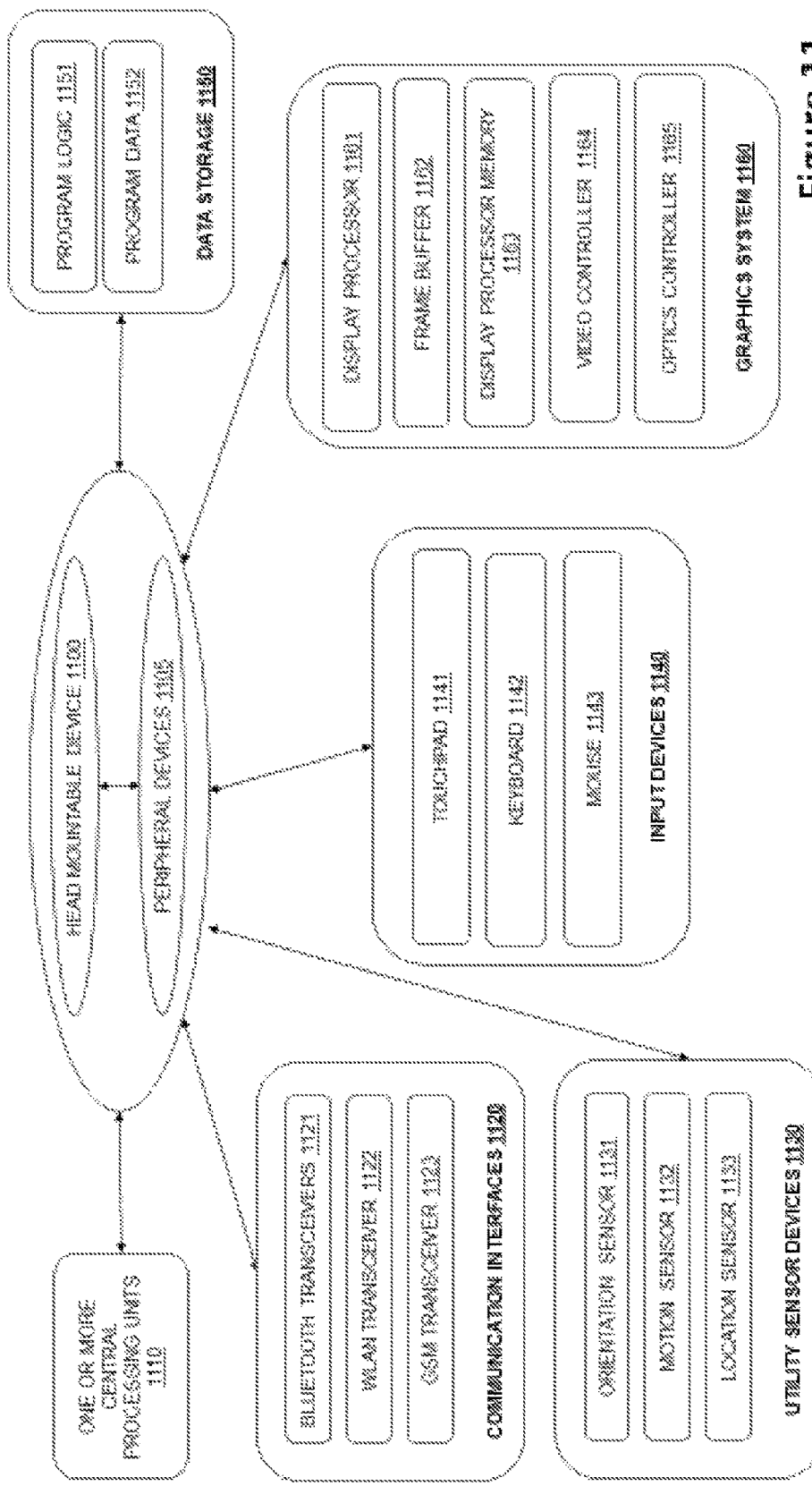
FIG. 11 is a block diagram depicting the overall system architecture of a preferred embodiment.

FIG. 11 depicts an overall system diagram of a preferred embodiment of the present invention. The system is housed as a head mountable device 1100 and a plurality of add-on peripheral devices 1105 which may take the shape of a notebook-type device, a traditional desktop PC, a touchpad, a smartphone, or any other type of similar device and combination thereof. The following components of the overall system may be housed either in the head-mountable device itself or in any of the connected add-on devices. The overall system comprises one or more processing units 1110 which can either constitute a shared resource, or especially if performance-critical tasks are performed, separate processors can be added to the singular components. Taking into account that the preferred embodiment requires light field processing in order to render the occlusion mask, this is a relatively processor-intensive task which does benefit from dedicated processors. The preferred embodiment further comprises a plurality of communication interfaces 1120 comprising a plurality of transceivers, wherein the transceivers perform the function of enabling wireless connections between the components themselves and with the wider world, such as to access cloud services. The plurality of transceivers in the preferred embodiment comprises Bluetooth transceivers 1121, a wireless local area network transceiver 1122 and a GSM transceiver 1123, however those skilled in the art will appreciate that any combination of state of the art wireless transceivers will suffice for enabling an embodiment of the present invention. The preferred embodiment further comprises a plurality of utility sensor devices 1130. These devices comprise an orientation sensor 1131 which is tasked with keeping track of changes in orientation of the head mountable device, a motion sensor 1132 which is tasked with keeping track of any movements of the user wearing the head mountable device and a location sensor 1133 which is tasked with being able to detect the user changing location, such as entering or leaving an office. The preferred embodiment of the present invention further comprises a plurality of input devices 1140. The input devices in turn comprise a touchpad 1141, a keyboard 1142 and a mouse 1143. Those skilled in the art will appreciate that any other combination of suitable input devices will satisfy the requirements demanded by the invention. The preferred embodiment further comprises a graphics system 1160 which comprises a display processor 1161, a frame buffer 1162, display processor memory 1163, a video controller 1164 and an optics controller 1165. With the exception of the optics controller 1165, the graphics components are similar to those found in a standard desktop personal computer. The makeup of the optics controller 1165 itself has been previously introduced with FIG. 10. The preferred embodiment of the present invention further comprises data storage 1150. Data storage is primarily used to store both program logic 1151 and program data 1152.

Figure 12:
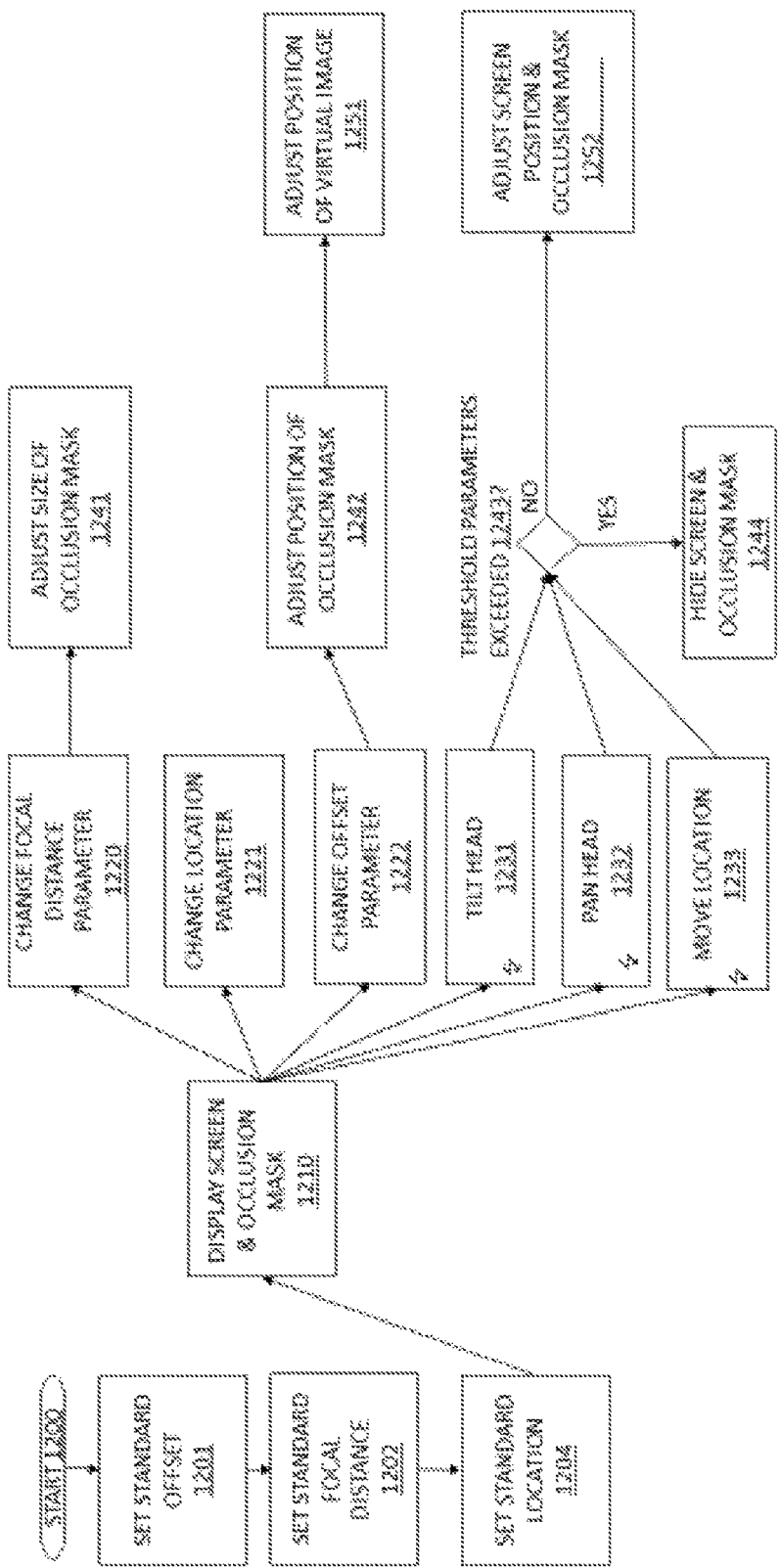
FIG. 12 is a flow chart depicting the control flow, events and operations of a preferred embodiment.

FIG. 12 depicts a flow chart relating to the operation of a preferred embodiment of the invention. At the start 1200 of the sequence the user is able to set a standard offset 1201, signifying the relative position of the virtual screen in the field of view. The offset would be specified in terms of XY coordinates. The user is also able to set the standard focal distance 1202 which defines how far away, in terms of radial distance, from the user the virtual screen is placed. Furthermore a standard location 1204 may be defined by the user. With the standard location the user defines in which locations the virtual screen should be displayed. For example the user could define that they only wish the virtual screen to appear automatically when sitting at their desk either in the workplace or at home. At all other locations the screen would have to be enabled manually. As the next step in the flow chart the display screen and the occlusion mask are shown 1210. This implies that the virtual monitor is now visible to the user. Whilst the virtual monitor is being displayed the user is free to re-adjust various parameters comprising changing the focal distance parameter 1220, changing the location parameter 1221 and changing the offset parameter 1222. In response to a change of focal distance the size of the occlusion mask has also got to be adjusted 1241. Likewise in response to a change of offset parameter 1222 the occlusion mask has to be adjusted accordingly 1242 and moreover the position of the virtual image has also got to be adjusted 1251. Whilst the virtual monitor is being displayed a number of events can be detected by the system, namely a change in head tilt angle 1231, a change in pan angle of the head 1232 and a change of location 1233. An event handler 1243 checks as the next step if any threshold parameters have been exceeded. If at least one of them has been exceeded the virtual monitor becomes hidden for as long as one of the parameters remains in excess of a threshold. If, however, no threshold is breached the virtual monitor remains visible. It may however become necessary to adjust the relative position of the virtual screen in response to a user movement. If, for example, the user moves backwards, away from the virtual screen, then the focal distance of the virtual image ought to be increased by an amount equal to the user movement. If, on the other hand, the user only changes the attitude of their head then the image of the virtual monitor ought to be repositioned accordingly so that the user remains under the illusion that the virtual screen is anchored to the real-world environment, such as sitting on a desk. There are, however, more simplistic alternative embodiments of the present invention wherein no adjustment of the virtual screen is made in response to user movements. In such embodiments the screen is always at the same preset focal distance and XY-offset and is manually switched on and off.

Unless otherwise defined, all technical and scientific terms used herein have the same meaning as commonly understood by one of ordinary skill in the art to which this invention belongs. Although methods and materials similar to or equivalent to those described herein can be used in the practice or testing of the wink gesture based control system, suitable methods and materials are described above. All publications, patent applications, patents, and other references mentioned herein are incorporated by reference in their entirety to the extent allowed by applicable law and regulations. The virtual monitor display technique for augmented reality environments may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. An augmented reality type head mountable device comprising
   a graphics system interface programmed to accept a video input of at least VGA standard, and
   at least one micro display, wherein the micro display has a resolution at least equal to that of the said video input, and
   at least one liquid lens, wherein the liquid lens is placed in an optical path of an image of the said micro display, and
   a binocular occlusion matrix, and
   a liquid lens controller, wherein the liquid lens controller is programmed to adjust tilt and focus settings on the at least one liquid lens in such a way as to shift a position of a projected image of the said plurality of the at least one micro display in any direction and wherein the liquid lens controller is programmed to interface with an occlusion matrix control circuit in such a way that said image of said micro display is rendered opaque.

2. The augmented reality type head mountable device of claim 1 wherein the liquid lens controller is programmed to adjust the optical properties of said at least one liquid lens in such a way that, in response to voluntary head or body movements made by a wearer of the head mountable device, said position of said projected image is adjusted in such a way as to anchor said projected image to a fixed position in the real world and wherein the voluntary nature of said movements is characterized either by an angular movement exceeding an angle of 15 degrees or a lateral movement exceeding a distance of 10 inches.

3. The augmented reality type head mountable device of claim 1 wherein the at least one micro display comprises a single monocular micro display.

4. The augmented-reality type head mountable device of claim 3 wherein the binocular occlusion matrix comprises at least two multi-cell liquid crystal shutters and wherein the said liquid lens controller is programmed to adjust the multi-cell liquid crystal shutters in such a way as to render opaque any cells of said shutters which are situated on an optical path behind the said projected image.

5. A method for enabling a wearer of a head mountable device to be presented with a virtualized computer monitor, the method comprising:
   displaying a virtualized computer monitor wherein the virtualized computer monitor is interfaced with a video output source and wherein said video output source is not an integral part of the said head mountable device; and
   in response to a movement of the head or of the body of said wearer:
   using a liquid lens controller to shift a retinally projected image of the virtualized computer monitor in a direction selected from the group consisting of: back, forth, left, right, up and down; and interfacing said liquid lens controller with an occlusion matrix control circuit in such a way that said retinally projected image is rendered opaque.

6. The method of claim 5, wherein the video output source is a personal computer.

7. The method of claim 5, wherein the video output source is a television set.

8. The method of claim 5, wherein the video output source is a touch screen operated mobile computing device.

9. The method of claim 5, wherein in response to a head or body movement by the said wearer, adjusting at least one property of said liquid lens in such a way that the virtualized computer monitor appears as anchored to a real-world location all the time.

10. The method of claim 9, wherein the at least one optical property is focal length.

11. The method of claim 9, wherein the at least one optical property is tilt.

12. The method of claim 5 comprising a step of hiding said virtualized computer monitor in response to at least one movement by the said wearer.

13. The method of claim 12, wherein the at least one movement comprises a head movement in excess of a pre-set angle from a looking straight ahead attitude.

14. The method of claim 12 wherein the at least one movement comprises a change of the said wearer's location away from a plurality of at least one pre-set locations in excess of a pre-set threshold distance.

15. The method of claim 5, wherein said movement is a voluntary movement and wherein the voluntary nature of said movement is characterized either by an angular movement exceeding an angle of 15 degrees or a lateral movement exceeding a distance of 10 inches.

16. The method of claim 5 comprising the step of enabling the said wearer to set at least one parameter relating to default offset in terms of X,Y or Z coordinates from a real-world anchor point of the said virtualized computer monitor.

17. The method of claim 5 comprising the step of enabling the wearer to set a default distance of said virtualized computer monitor in relation to the said wearer.

18. A nontransitory computer-readable medium on which are stored program instructions that, when executed by a processor, cause the processor to perform the operations of
controlling at least one liquid lens in such a way that, in response to a head or a body movement of a user of an augmented reality type head mountable device, a retinally projected image of a micro display is repositioned on an axis selected from the group consisting of: X, Y and Z and;
interfacing a controller for said liquid lens with an occlusion matrix control circuit in such a way that said retinally projected image of said micro display is rendered opaque.

19. The nontransitory computer-readable medium of claim 18 wherein said head or body movement is a voluntary movement and wherein the voluntary nature of said movement is characterized either by an angular movement exceeding an angle of 15degrees or a lateral movement exceeding a distance of 10 inches.

* * * * *